United States Patent
Tomita et al.

(10) Patent No.: US 6,244,374 B1
(45) Date of Patent: Jun. 12, 2001

(54) ELECTRICALLY OPERATED POWER STEERING DEVICE

(75) Inventors: Masaaki Tomita, Toyota; Ryoji Mizutani, Aichi-ken, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/377,617

(22) Filed: Aug. 19, 1999

(30) Foreign Application Priority Data

Aug. 21, 1998 (JP) .................................................. 10-235942

(51) Int. Cl.⁷ ...................................................... B62D 5/04
(52) U.S. Cl. ........................ 180/446; 180/400; 180/443; 180/444
(58) Field of Search ................................... 180/400, 444, 180/446, 443

(56) References Cited

U.S. PATENT DOCUMENTS

| | | | | |
|---|---|---|---|---|
| 4,666,014 | * | 5/1987 | Carlson et al. | 180/444 |
| 4,735,271 | * | 4/1988 | Shimizu | 180/446 |
| 4,800,974 | * | 1/1989 | Wand et al. | 180/444 |
| 4,918,744 | * | 4/1990 | Shimizu | 388/833 |
| 5,299,649 | * | 4/1994 | Sano et al. | 180/400 |
| 5,437,349 | * | 8/1995 | Kurahashi et al. | 180/446 |
| 5,555,951 | * | 9/1996 | Sugino et al. | 180/444 |
| 5,573,079 | * | 11/1996 | Suda et al. | 180/444 |
| 5,650,701 | * | 7/1997 | Shimizu et al. | 318/489 |
| 5,904,224 | * | 5/1999 | Onodera et al. | 180/444 |
| 5,908,457 | * | 6/1999 | Higashira et al. | 701/41 |
| 5,921,344 | * | 7/1999 | Boyer | 180/444 |
| 5,971,094 | * | 10/1999 | Joshita | 180/444 |
| 5,988,311 | * | 11/1999 | Kuribayashi et al. | 180/444 |
| 6,000,491 | * | 12/1999 | Shimizu et al. | 180/444 |
| 6,006,854 | * | 12/1999 | Nakajima | 180/446 |
| 6,026,924 | * | 2/2000 | Godek | 180/444 |
| 6,041,885 | * | 3/2000 | Watanabe et al. | 180/444 |
| 6,082,483 | * | 7/2000 | Taniguchi et al. | 180/444 |
| 6,123,167 | * | 9/2000 | Miller et al. | 180/444 |

FOREIGN PATENT DOCUMENTS

| | | |
|---|---|---|
| 8-163889 | 6/1996 | (JP) . |
| 9-215230 | 8/1997 | (JP) . |

* cited by examiner

*Primary Examiner*—Paul N. Dickson
*Assistant Examiner*—Deanna Draper
(74) *Attorney, Agent, or Firm*—Oliff & Berridge, PLC

(57) ABSTRACT

In an electrically operated power steering device wherein a rotational shaft of an electric motor is rotationally driven so as to apply a steering assist force to a steering shaft, a stator of the electric motor is provided with teeth portions composed of electromagnetic steel plates, coils wound around the teeth portions, and a yoke portion made of a magnetic substance that accommodates the coils and the teeth portions and can be utilized as a housing. Hence, the electrically operated power steering device can be made simple and compact, and it is possible to ensure running stability of the vehicle appropriately (i.e., to prevent swinging motions in response to a force inputted from the steering wheels).

5 Claims, 3 Drawing Sheets

ELECTRICALLY OPERATED POWER STEERING DEVICE

INCORPORATION BY REFERENCE

The disclosure of Japanese Patent Application No. HEI 10-235942 filed on Aug. 21, 1998 including the specification, drawings and abstract is incorporated herein by reference in its entirety.

BACKGROUND OF THE INVENTION

1. Field of the Invention

The present invention relates to an electrically operated power steering device that is employed in a vehicle such as an automobile or the like.

2. Description of the Related Art

In an electrically operated power steering device of a certain type, a rotational shaft of an electric motor is rotationally driven so as to apply a steering assist force to a steering shaft. The electrically operated power steering device of this type is disclosed, for example, in Japanese Patent Publication Laid-Open No. HEI 8-163889.

However, according to the electrically operated power steering device of the aforementioned type, a stator of the electric motor is provided with a yoke portion with which teeth portions are integrated, and coils are wound around the teeth portions. Besides, the stator is securely fixed within a housing. Thus, the yoke portion and the housing have a double structure, and the overall diameter is comparatively large. On the contrary, if an attempt is made to reduce the size of the electric motor without changing the above-described structure, it is necessary to make the teeth portions and the yoke portion compact. In this case, it is impossible to ensure sufficient output torque of the electric motor. In other words, the aforementioned electrically operated power steering device makes it difficult to ensure sufficient output torque of the electric motor and to reduce the size of the electric motor.

SUMMARY OF THE INVENTION

The present invention has been conceived in consideration of the above-described problem. It is thus an object of the present invention to provide an electrically operated power steering device of a simple and compact structure.

According to a first aspect of the present invention, there is provided an electrically operated power steering device that is composed of an electric motor generating a steering assist force that assists a steering force and a steering shaft to which the steering assist force is applied. The electrically operated power steering device has the following features. That is, the electric motor has a stator and a rotational shaft that is rotationally driven within the stator so as to apply a steering assist force to the steering shaft. The stator has teeth portions composed of electromagnetic steel plates, coils wound around the teeth portions, and a yoke portion made of a magnetic substance that accommodates the coils and the teeth portions and that can be utilized as a housing.

In this case, the yoke portion may be made of a steel pipe, or the yoke portion may be made of an iron type magnetic material with a low percentage of carbon contents. Further, the steering shaft may be a rack bar that is arranged coaxially within the rotational shaft of the electric motor and that penetrates the rotational shaft, or the yoke portion may partially serve as part of housing that accommodates part of the rotational shaft and part of the rack bar.

In the electrically operated power steering device of the present invention, the yoke portion can be utilized also as part of the housing of the electrically operated power steering device. Thus, the electrically operated power steering device can be made simple and compact. Furthermore, steering preload torque (loads) can be generated by means of an iron loss at the yoke portion. Hence, it is possible to ensure running stability of the vehicle appropriately (i.e., to prevent swinging motions in response to a force (reverse input) inputted from the steering wheels via the steering shaft).

Still further, according to the present invention, in the case where the yoke portion is made of a steel pipe that is less expensive than electromagnetic steel plates, the amount of expensive electromagnetic steel plates used for the stator can be reduced. Also, the yoke portion can be constructed at low costs, and the electrically operated power steering device can be manufactured at low costs. In the case where the yoke portion is made of an iron type magnetic material with a low percentage of carbon contents, the steering preload torque can be set optimally in accordance with the type of the vehicle by suitably selecting the material of the yoke portion among iron type magnetic materials with a low percentage of carbon contents.

Still further, according to the present invention, in the case where the steering shaft is a rack bar that is arranged coaxially within the rotational shaft of the electric motor and that penetrates the rotational shaft, the electric motor can be arranged around the rack bar in a compact manner, whereby it becomes possible to reduce the overall diameter and to reduce the size of the electrically operated power steering device. Furthermore, in the case where the yoke portion partially serves as part of the housing that accommodates part of the rotational shaft and part of the rack bar, the number of components of the electrically operated power steering device can be reduced, and the manufacturing costs can also be reduced.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
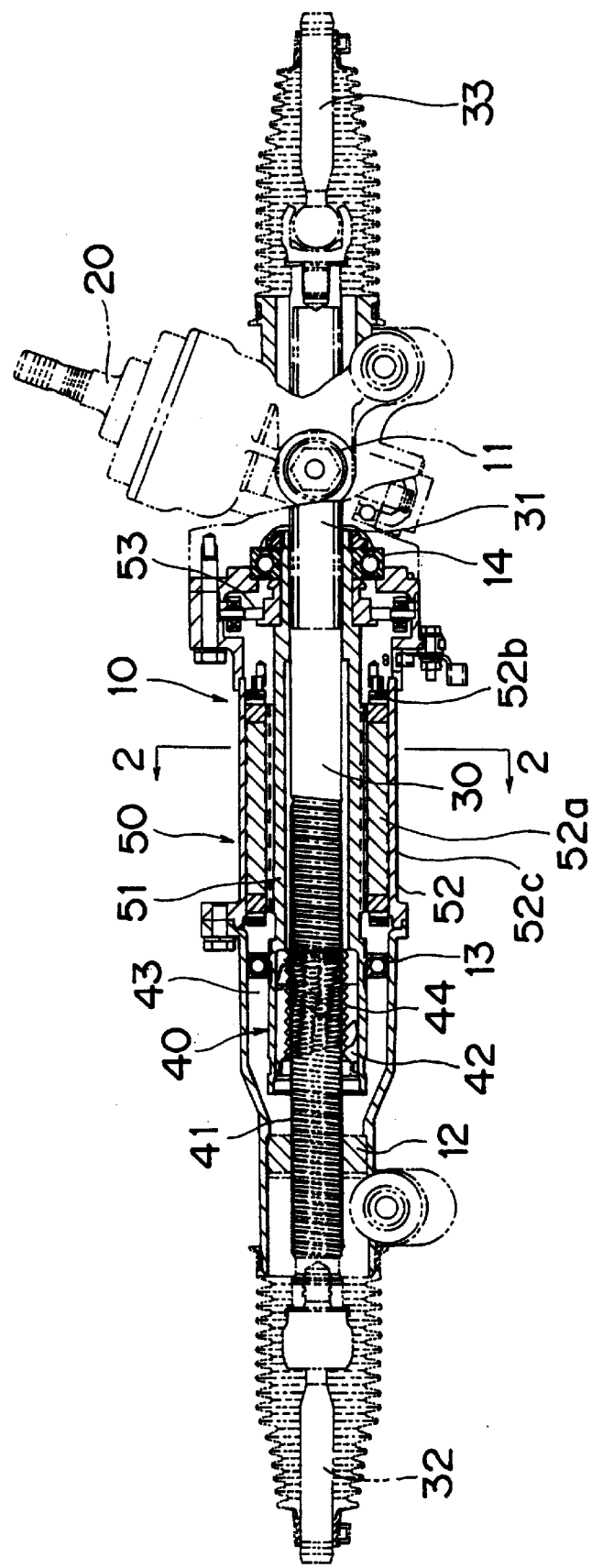
FIG. 1 is a general view of an electrically operated power steering device according to one embodiment of the present invention.

One embodiment of the present invention will be described hereinafter with reference to the accompanying drawings. Referring to FIG. 1, the present invention is applied to a rack and pinion type steering device of a vehicle. This steering device includes a housing 10, which extends in left-to-right directions of the vehicle and is mounted to a vehicle body (not shown). Mounted to the housing 10 are an input shaft 20, a steering shaft 30, a ball screw mechanism 40, an electric motor 50 and the like.

The input shaft 20 is mounted to the housing 10 such that the input shaft 20 can rotate but cannot move in the axial direction. The input shaft 20 is coupled at an outer end portion protruding from the housing 10 to a steering wheel via a universal joint, an intermediate shaft, a universal joint, a steering main shaft and the like (all not shown) such that torque can be transmitted from the input shaft 20 to the steering wheel. Also, at a pinion (not shown) formed in an inner end portion of the input shaft 20, the input shaft 20 engages rack teeth 31 formed on the steering shaft 30 such that a steering force can be transmitted from the input shaft 20 to the rack teeth 31. The rotation of the input shaft 20 causes the steering shaft 30 to move in the left-to-right directions of the vehicle (in the axial direction of the steering shaft).

The steering shaft 30 is also referred to as a rack bar. The steering shaft 30 has a portion corresponding to the pinion (a back face portion of the portion where the rack teeth 31 are formed). The portion corresponding to the pinion is elastically supported by a known rack guide 11, which is disposed opposite from the pinion (and mounted to the housing 10). The portion corresponding to the pinion can move in the radial direction of the steering shaft 30. On the other hand, a left end portion of the steering shaft 30 is securely supported by an end stopper 12 (which is mounted to the housing 10) such that the left end portion cannot move in the radial direction of the steering shaft 30. The left end portion can move in the left-to-right directions of the vehicle (in the axial direction of the steering shaft) and cannot rotate. The steering shaft 30 penetrates the housing 10 and is coupled at its left and right ends to steering wheels (not shown) via tie rods 32 and 33 and a knuckle arm (not shown) such that a steering force can be transmitted from the steering shaft 30 to the steering wheels. Further, the steering shaft 30 is integrally provided with a screw shaft 41 of the ball screw mechanism 40. Helical grooves are formed in an outer periphery of the screw shaft 41.

The ball screw mechanism 40, which is located between an elastic support portion of the steering shaft 30 (the portion supported by the rack guide 11) and a secure support portion of the steering shaft 30 (the portion supported by the end stopper 12), serves as rotational displacement conversion means for converting the rotation of a rotational shaft 51 of the electric motor 50 to axial displacement of the steering shaft 30 and thus achieving transmission of a force therefrom. The ball screw mechanism 40 is arranged coaxially with respect to the steering shaft 30 and is composed of the screw shaft 41, a nut 42 and multiple balls 44. The steering shaft 30 is integrally provided with the screw shaft 41. On the outer periphery of the screw shaft 41, the nut 42 is mounted to the rotational shaft 51 of the electric motor 50 such that the nut 42 can rotate upon the steering shaft 30 (can rotate together with the rotational shaft 51) and cannot move in the direction of the steering shaft 30. The balls 44 are rotatably held by a thin cylindrical cage 43 between the nut 42 and the screw shaft 41, and are interposed between the helical grooves formed in the outer periphery of the screw shaft 41 and the helical grooves formed in the inner periphery of the nut 42.

The electric motor 50 applies an axial steering assist force to the steering shaft 30 via the ball screw mechanism 40, and is arranged coaxially with respect to the steering shaft 30. The electric motor 50 is provided with a tubular rotational shaft (output shaft) 51 and a stator 52. The rotational shaft 51 is mounted to the housing 10 via ball bearings 13 and 14 such that the rotational shaft 51 can rotate but cannot move in the axial direction. The stator 52 constitutes part of the housing 10. A control device (not shown) controls a rotational output of the electric motor 50 based on a signal from a sensor 53 or the like.

Figure 2:
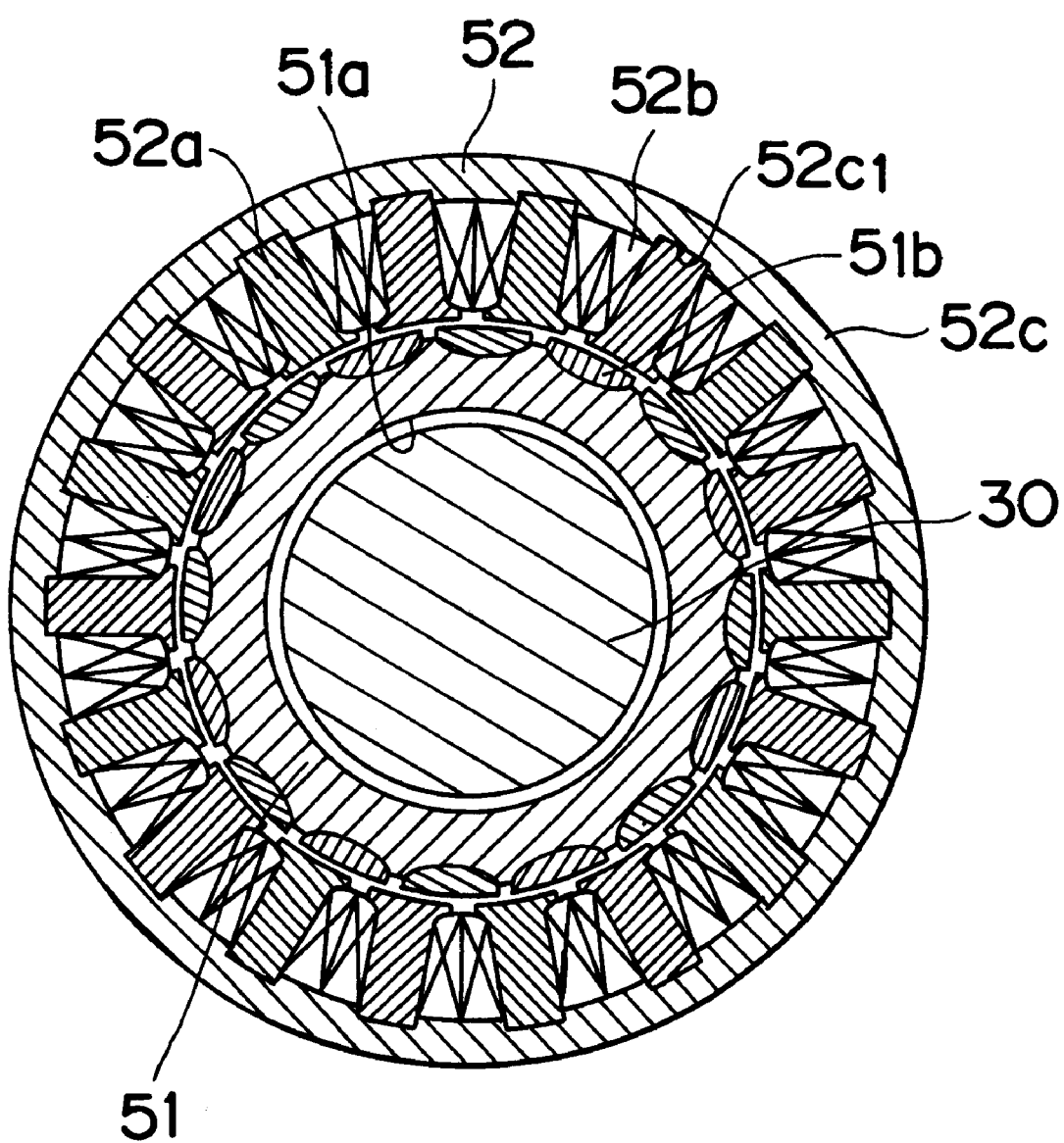
FIG. 2 is a cross-sectional view taken along line II—II in FIG. 1, showing structures of a rotational shaft and a stator of an electric motor.

As shown in FIG. 2, the rotational shaft 51 is composed of a shaft body 51a and 16 permanent magnets 51b. The shaft body 51a is in the shape of a stepped cylinder, and the permanent magnets 51b are arranged at equal intervals and secured to the outer periphery of the shaft body 51a. The respective permanent magnets have S- and N-poles that are alternately arranged. Each of the permanent magnets 51b is long in the axial direction. On the inner periphery side, each of the permanent magnets 51b is formed in the shape of an arc that is convex toward the inner periphery. On the outer periphery side, each of the permanent magnets 51b is formed in the shape of a circular arc whose center coincides with the rotational center of the rotational shaft 51. Each of the permanent magnets 51b is thinner at circumferential opposed end portions than at the central portion.

The stator 52 is provided with 18 teeth portions 52a, coils 52b and a yoke portion 52c. The teeth portions 52a are constructed as blocks by stacking electromagnetic steel plates (silicon steel plates) on one another in the axial direction of the rotational shaft 51. The coils 52b are wound around the teeth portions 52a respectively. The yoke portion 52c accommodates the coils 52b and the teeth portions 52a. The yoke portion 52c functions as a magnetic path forming body and is composed of a magnetic substance that can be utilized as a housing. The yoke portion 52c is made of a pipe of low-carbon steel such as S10C, S15C or the like. The stator 52 is manufactured in the following manner. That is, the coils 52b that are preliminarily formed into a predetermined shape are fitted to the teeth portions 52a respectively. Then, the teeth portions 52a are fitted into grooves 52c1 formed in the inner periphery of the yoke portion 52c. Finally, the teeth portions 52a, the coils 52b and the yoke portion 52c are integrated by means of plastic molding.

In the thus-constructed electrically operated power steering device of this embodiment, a steering force is transmitted directly from the pinion of the input shaft 20 to the portion of the steering shaft 30 where the rack teeth 31 are formed. Under the control of the control device (not shown), the output of the electric motor 50 is transmitted to the portion of the steering shaft 30 where the screw shaft 41 is formed, via the ball screw mechanism 40. The output (steering assist force) of the electric motor 50 suitably assists the steering force.

Furthermore, in the thus-constructed electrically operated power steering device of this embodiment, the yoke portion 52c of the electric motor 50 can be utilized also as part of the housing 10 of the electrically operated power steering device. Accordingly, the electrically operated power steering device can be made simple and compact, and steering preload torque (loads) can be generated by means of an eddy-current loss (core loss) at the yoke portion 52c. Hence, it is possible to ensure running stability of the vehicle appropriately (i.e., to prevent swinging motions in response to a force (reverse input) inputted from the steering wheels via the steering shaft).

In other words, if the rotational shaft 51 of the electric motor 50 is caused to rotate upon generation of a reverse input from the steering wheels via the steering shaft 30, a force acting to stop the rotation of the electric motor 50 is generated due to a magnetic action of the magnetic substance that constitutes the stator 52. The force then acts on the rotational shaft 51 of the electric motor 50. Thus, the rattling of the steering shaft 30 resulting from a reverse input is inhibited, and the running stability of the vehicle is increased. This cannot be accomplished by means of the control of the electric motor 50, unlike the case where a steering assist force is applied.

Further, according to this embodiment, the yoke portion 52c of the electric motor 50 is made of a steel pipe, which is less expensive than electromagnetic steel plates. Therefore, the amount of expensive electromagnetic steel plates used for the stator 52 can be reduced. Also, the yoke portion 52c can be constructed at low costs, and the electrically operated power steering device can be manufactured at low costs. Further, the steering shaft 30 is a rack bar that is arranged coaxially within the rotational shaft 51 of the electric motor 50 and penetrates the rotational shaft 51. Hence, the electric motor 50 can be arranged around the rack bar, that is, the steering shaft 30 in a compact manner, whereby it becomes possible to reduce the overall diameter and to reduce the size of the electrically operated power steering device.

In the aforementioned embodiment, the yoke portion 52c of the stator 52 of the electric motor 50 is made of a steel pipe. However, the yoke portion 52c can be made of another material as long as it is a magnetic substance that can be utilized as the housing. For example, the yoke portion 52c can be made of an iron type magnetic material with a low percentage of carbon contents. In the case where the yoke portion 52c is made of an iron type magnetic material with a low percentage of carbon contents, the steering preload torque can be set optimally in accordance with the type of the vehicle by suitably selecting the material of the yoke portion 52c among iron type magnetic materials with a low percentage of carbon contents.

Figure 3:
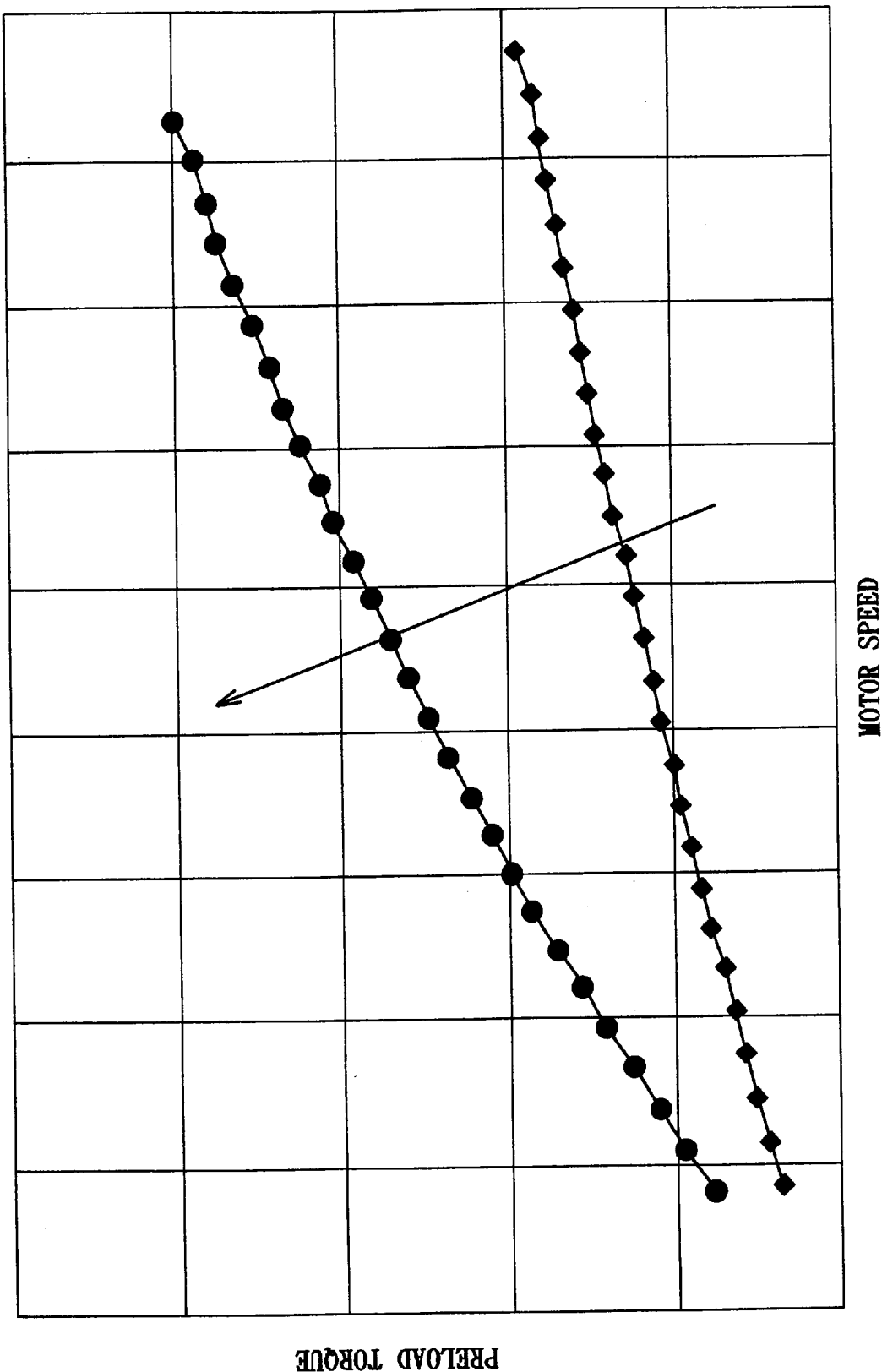
FIG. 3 is a diagram showing a relationship between preload torque and motor speed in the case where a yoke portion is made of an iron type magnetic material with a low percentage of carbon contents.

FIG. 3 shows an example of the relationship between preload torque and motor speed in the case where the yoke portion 52c is made of an iron type magnetic material with a low percentage of carbon contents. As can be seen from FIG. 3, by selecting the material of the yoke portion 52c, it is possible to set preload torque for a certain motor speed. In the case where the material of the yoke portion 52c is switched from S10C to S15C, the amount of carbon contained in the yoke portion 52c increases. That is, as indicated by an arrow in FIG. 3, the gradient of the line increases. In this manner, it is possible to increase preload torque. Alternatively, by increasing the amount of manganese contained in the material of the yoke portion 52c, the gradient of the line in FIG. 3 increases, whereby it becomes possible to increase preload torque. (It is also possible to change preload torque by changing the amount of silicon contained in the material of the yoke portion 52c).

Further, in the aforementioned embodiment, leftwards of the yoke portion 52c of the electric motor 50 in FIG. 1, part of the housing 10 that accommodates the rotational shaft 51 of the electric motor 50 and the left end portion of the steering shaft 30 is constructed separately from the yoke portion 52c of the electric motor 50. Then, that part of the housing 10 is integrally attached to the yoke portion 52c. However, it is also possible to form part of the housing 10 that accommodates the rotational shaft 51 of the electric motor 50 and the left end portion of the steering shaft 30 integrally with the yoke portion 52c of the electric motor 50.

In other words, the yoke portion 52c partially serves as the housing that accommodates the rotational shaft 51 and the left end portion of the steering shaft (rack bar) 30. In this case, the number of components of the electrically operated power steering device can be reduced, and the manufacturing costs can also be reduced.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An electrically operated power steering device comprising:
   a steering shaft to which a steering assist force that assists a steering force is applied; and
   an electric motor having a stator and a rotational shaft that is rotationally driven within the stator so as to apply the steering assist force to the steering shaft, the stator having teeth portions composed of electromagnetic steel plates stacked on one another in an axial direction of the rotational shaft, coils wound around the teeth portions, and a yoke portion made of an iron-type magnetic substance that accommodates the coils and the teeth portions and that forms at least a part of a housing of the electric motor, the magnetic substance having a percentage of carbon contents determined to control a steering preload torque.

2. The electrically operated power steering device according to claim 1, herein the steering shaft comprises a rack bar arranged coaxially within and penetrates the rotational shaft of the electric motor.

3. The electrically operated power steering device according to claim 2, wherein the yoke portion partially serves as a housing that accommodates part of the rotational shaft and part of the rack bar.

4. The electrically operated power steering device according to claim 1, further comprising a detector that detects a signal indicative of a running state of a vehicle, wherein a rotational output of the rotational shaft of the electric motor is controlled based on a signal from the detector.

5. The electrically operated power steering device according to claim 1, wherein, if a rotational force is inputted to the rotational shaft of the electric motor via the steering shaft, a force that acts opposite to a direction of action of the rotational force is generated due to a magnetic action of the stator.

* * * * *